United States Patent Office 3,009,910
Patented Nov. 21, 1961

3,009,910
2,4-DISULFAMYL-ANILINE DERIVATIVES
Carl Ziegler, Glenside, Pa., assignor to Merck & Co., Inc., Rahway, N.J., a corporation of New Jersey
No Drawing. Filed Jan. 4, 1960, Ser. No. 26
12 Claims. (Cl. 260—239.8)

This invention comprises novel disulfamylaniline compounds containing as a substituent attached to the nitrogen atom in the 2-position sulfamyl group an aminomethylene radical, and, in addition at least one other substituent attached to the 5-position carbon of the benzene nucleus. The invention also embraces a novel method by which the compounds can be prepared.

The compounds of this invention can be considered to have the general structural formula:

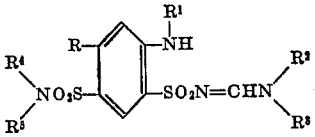

wherein R represents halogen or a halogen-like radical such as chlorine, bromine, fluorine, trifluoromethyl, trichloromethyl and the like; a lower alkyl radical, preferably a lower alkyl radical having from 1 to 5 carbon atoms, nitro and the amino group; $R^1$ represents hydrogen or a lower alkyl radical advantageously having from 1 to 5 carbon atoms;

represents a mono-lower-alkylamino, a di-lower-alkylamino or a heterocyclic ring, particularly the piperidyl, pyrrolidyl or morpholinyl group; and

represents the amino group, a mono-lower-alkylamino, a di-lower-alkylamino or a heterocyclic ring advantageously the piperidyl, pyrrolidyl or morpholinyl group. The salts of the foregoing compounds also are embraced within the scope of this invention and in particular the alkali metal salts.

The novel compounds of this invention are useful principally because of their diuretic, natriuretic and saluretic properties. The compounds are of particular interest because they are long acting, thus eliciting their diuretic properties over a much longer period of time than occurs with other diuretics of the disulfamylaniline family. The compounds are effective upon oral administration in the form of tablets or capsules or the like as well as upon injection when dissolved in a dilute alkaline medium or polyethyleneglycol. The pharmacotherapeutic properties of these compounds make them particularly useful in the treatment of congestive heart failure and other abnormalities which produce an imbalance in the electrolyte concentration in the body, for example, those in which retention of sodium occurs. The compounds having the above structural formula wherein R is a halogen radical, especially the chlorine or trifluoromethyl radical, and among this group of compounds those wherein $R^1$, $R^4$ and $R^5$ each is a hydrogen atom are of particular interest as long acting diuretic agents.

The novel compounds of this invention are prepared by treating a 1,2,4-benzothiadiazine-1,1-dioxide compound with an amine. Ring cleavage with simultaneous substitution on the 2-position nitrogen of the benzothiadiazine nucleus readily occurs under mild reaction conditions, such as at room temperature or with slight warming.

The 1,2,4-benzothiadiazine-1,1-dioxide starting materials are prepared by one or another of the methods described in U.S. Patents Nos. 2,809,194, 2,910,473, 2,910,-475, or by other well known methods such as those described by Freeman and Wagner, Journal of Organic Chemistry, volume 16, page 815 (1951), or by the methods described by Parke et al. in the 1950 issue of Journal of the Chemical Society, page 1760, or by a method described in one or more of the papers referred to in the bibliography of either one of these journal references.

The preparation of the novel compounds of this invention is more fully described in the following examples. It is to be understood, however, that the examples are illustrative of the compounds embraced by this invention and are not to be construed as limiting the invention to the particular reaction conditions specifically described.

EXAMPLE 1

*2-dimethylaminomethylenesulfamyl-4-sulfamyl-5-chloroaniline*

Twenty grams of 6-chloro-7-sulfamyl-1,2,4-benzothiadiazine-1,1-dioxide is added to 50 mls. of anhydrous liquid dimethylamine. The amine is allowed to evaporate and the residue then is recrystallized from a mixture of alcohol and water yielding 11.2 g. of 2-dimethylaminomethylenesulfamyl - 4 - sulfamyl - 5 - chloroaniline, M.P. 208–210° C.

Analysis.—Calculated for $C_9H_{13}ClN_4O_4S_2$: C, 31.71; H, 3.84; N, 16.44. Found: C, 32.10; H, 3.86; N, 16.35.

EXAMPLE 2

*2-piperidinomethylenesulfamyl-4-sulfamyl-5-chloroaniline*

Ten grams of 6-chloro-7-sulfamyl-1,2,4-benzothiadiazine-1,1-dioxide is added to 16 ml. of piperidine and the reaction then heated for one-half hour on the steam bath. The residue is dissolved in dilute sodium hydroxide at room temperature and rapidly extracted three times with ether. The aqueous phase is acidified with dilute hydrochloric acid whereupon 4.3 g. of starting material is recovered. After standing overnight, there is obtained 3.8 g. of 2-piperidinomethylenesulfamyl-4-sulfamyl-5-chloroaniline, M.P. 210–212° C.

Analysis.—Calculated for $C_{12}H_{17}ClN_4O_4S_2$: C, 37.84; H, 4.50; N, 14.71. Found: C, 37.96; H, 4.58; N, 14.69.

EXAMPLE 3

*2-dimethylaminomethylenesulfamyl-4-dimethylsulfamyl-5-chloroaniline*

Twenty-five grams of 6-chloro-1,2,4-benzothiadiazine-1,1-dioxide-7-sulfonyl chloride (prepared by the reaction of 6-chloro-7-sulfamyl-1,2,4-benzothiadiazine-1,1-dioxide with chlorosulfonic acid with heating on the steam bath) is added to 50 ml. of anhydrous liquid dimethylamine. The amine then is permitted to evaporate and the residue obtained is recrystallized from alcohol to yield 18.8 g. of 2-dimethylaminomethylenesulfamyl-4-dimethylsulfamyl-5-chloroaniline, M.P. 195–197° C.

Analysis.—Calculated for $C_9H_{17}ClN_4O_4S_2$: C, 35.81; H, 4.65; N, 15.19. Found: C, 35.81; H, 4.72; N, 15.10.

EXAMPLE 4

*2-pyrrolidinomethylenesulfamyl-4-sulfamyl-5-bromoaniline*

By replacing the benzothiadiazine and the piperidine employed in Example 2 by equivalent quantities of 6-bromo-7-sulfamyl-1,2,4-benzothiadiazine-1,1-dioxide and pyrrolidine, and following substantially the same procedure described in Example 2, there is obtained 2-pyrrolidinomethylenesulfamyl-4-sulfamyl-5-bromoaniline.

EXAMPLE 5

*2-methylethylaminomethylenesulfamyl-4-sulfamyl-5-methylaniline*

By replacing the benzothiadiazine and the dimethylamine employed in Example 1 by equivalent quantities of 6-methyl-7-sulfamyl-1,2,4-benzothiadiazine-1,1-dioxide and methylethylamine and following substantially the same procedure described in Example 1, there is obtained 2-methylethylaminomethylenesulfamyl-4-sulfamyl-5-methylaniline.

EXAMPLE 6

*2-(4-morpholinylmethylenesulfamyl)-4-sulfamyl-5-chloro-N-methylaniline*

By replacing the benzothiadiazine and the piperidine employed in Example 2 by equivalent quantities of 4-methyl - 6 - chloro - 7 - sulfamyl - 1,2,4 - benzothiadiazine-1,1-dioxide and morpholine, and following substantially the same procedure described in Example 2, there is obtained 2-(4-morpholinylmethylenesulfamyl)-4-sulfamyl-5-chloro-N-methylaniline.

EXAMPLE 7

*2-methylaminomethylenesulfamyl-4-sulfamyl-5-nitro-N-ethylaniline*

By replacing the benzothiadiazine and the dimethylamine employed in Example 1 by equivalent quantities of 4-ethyl-6-nitro-7-sulfamyl-1,2,4-benzothiadiazine-1,1-dioxide and methylamine, and following substantially the same procedure described in Example 1, there is obtained 2 - methylaminomethylenesulfamyl - 4 - sulfamyl - 5 - nitro-N-ethylaniline.

EXAMPLE 8

*2-methylaminomethylenesulfamyl-4-sulfamyl-5-amino-N-methylaniline*

By replacing the benzothiadiazine and the dimethylamine employed in Example 1 by equivalent quantities of 4-methyl-6-amino-7-sulfamyl-1,2,4-benzothiadiazine-1,1-dioxide and methylamine, and following substantially the same procedure described in Example 1, there is obtained 2-methylaminomethylenesulfamyl-4-sulfamyl-5-amino-N-methylaniline.

EXAMPLE 9

*2-dimethylaminomethylenesulfamyl-4-(N-butylsulfamyl)-5-chloroaniline*

By replacing the benzothiadiazine employed in Example 1 by an equivalent quantity of 6-chloro-7-(N-butylsulfamyl)-1,2,4-benzothiadiazine - 1,1 - dioxide, and following substantially the same procedure described in Example 1, there is obtained 2-dimethylaminomethylenesulfamyl-4-(N-butylsulfamyl)-5-chloroaniline.

EXAMPLE 10

*2-methylaminomethylenesulfamyl-4-(1-pyrrolidylsulfonyl)-5-chloroaniline*

By replacing the benzothiadiazine and the dimethylamine employed in Example 1 by equivalent quantities of 6-chloro-7-(1-pyrrolidylsulfonyl) - 1,2,4 - benzothiadiazine-1,1-dioxide and methylamine, and following substantially the same procedure described in Example 1, there is obtained 2-methylaminomethylenesulfamyl-4-(1-pyrrolidylsulfonyl)-5-chloroaniline.

EXAMPLE 11

*2-methylaminomethylenesulfamyl-4-(4-morpholinylsulfonyl)-5-chloroaniline*

By replacing the benzothiadiazine and the dimethylamine employed in Example 1 by equivalent quantities of 6-chloro-7-(4-morpholinylsulfonyl)-1,2,4-benzothiadiazine-1,1-dioxide and methylamine, and following substantially the same procedure described in Example 1, there is obtained 2-methylaminomethylenesulfamyl-4-(4-morpholinylsulfonyl)-5-chloroaniline.

EXAMPLE 12

*2-dimethylaminomethylenesulfamyl-4-sulfamyl-5-trifluoromethylaniline*

*Step A.*—2-amino-4-trifluoromethylbenzenesulfonic acid (32 g., 0.132 mole) is added portionwise with stirring to 100 ml. of chlorosulfonic acid, cooled in an ice-bath over a 5–10 minute period. The solution is heated in an oil bath at 150° C. for 3 hours and cooled to 20° C. Thionyl chloride (40 ml.) is added and the mixture heated on the steam bath for 1 hour, then cooled to 0° C. and poured cautiously onto ice. The aqueous liquor is decanted and the residual solid heated on the steam bath with 500 ml. of 28% ammonium hydroxide for 2 hours. Upon cooling, the product is collected on the filter, washed with water and dried. To remove a trace amount of 2-sulfamyl-5-trifluoromethylaniline that is obtained along with the product, the material remaining on the filter is digested with 500 ml. of boiling benzene, filtered and the benzene soluble material recrystallized from aqueous alcohol yielding 2,4-disulfamyl-5-trifluoromethylaniline as colorless needles, M.P. 241–242° C.

*Step B.*—A solution of 2 g. of the thus obtained 2,4-disulfamyl-5-trifluoromethylaniline in 25 ml. of 98–100% formic acid is heated under reflux for 2 hours. After removal of 10–15 ml. of solvent by distillation, the mixture is cooled in an ice-bath and the end product collected and crystallized from a mixture of alcohol and hexane yielding 6-trifluoromethyl-7-sulfamyl-1,2,4-benzothiadiazine-1,1-dioxide as colorless needles, M.P. 294–295° C.

*Step C.*—By replacing the benzothiadiazine employed in Example 1 by the thus obtained 6-trifluoromethyl-7-sulfamyl-1,2,4-benzothiadiazine-1,1-dioxide, and following substantially the same procedure described in Example 1, there is obtained 2-dimethylaminomethylenesulfamyl-4-sulfamyl-5-trifluoromethylaniline.

The alkali metal salts of the novel compounds of this invention can be prepared by dissolving the selected compound in an aqueous or alcoholic solution of the alkali metal hydroxide, and, if desired, isolating the salt by evaporating the solvent. Any of the conventional alkali metal salts such as sodium, potassium, lithium, or the like salts can be prepared by this method or by other methods known to organic chemists.

The dosage of the novel compounds of this invention will vary over a wide range and for this reason tablets, pills, capsules, syrups, elixirs, injectable solutions and the like containing per unit dosage from about 25 mg. to about 300 mg. or more of the active ingredient can be made available to the physician for the symptomatic adjustment of the dosage to the individual patient. As these compounds can be put up in suitable dosage forms by methods known to pharmacists, the following example illustrates only one of the many methods by which these compounds can be compounded.

EXAMPLE 13

*Compressed tablet comprising 50 mg. of active ingredient*

| | Per tablet, mg. |
|---|---|
| 2-dimethylaminomethylenesulfamyl-4-sulfamyl-5-chloraniline | 50 |
| Starch, U.S.P. | 20.2 |
| Lactose | 26.5 |
| Magnesium Stearate | 0.5 |
| | 97.2 |

The 2-dimethylaminomethylenesulfamyl-4-sulfamyl-5-chloroaniline, part of the starch and all of the lactose are mixed together and granulated with a sufficient quantity of starch paste, prepared from the balance of the starch. The granulation (14 mesh) is dried at 45° C. for 20 hours and then rescreened 16 mesh. The magnesium stearate then is screened through a No. 90 bolting cloth onto the granulation and the entire quantity blended. The granulation is compressed into tablets of appropriate size on a machine using flat-faced double edged punches with a score.

While the above examples describe the preparation of certain compounds which are illustrative of the novel compounds of this invention, and a certain specific dosage form suitable for administering the novel compounds in therapy, and a novel method by which these compounds can be prepared, it is to be understood that the invention is not to be limited by the examples or by the specific reaction conditions described for the preparation of the compounds or by the specific ingredients included in the pharmaceutical preparation, but is understood to embrace variations or modifications falling within the scope of the appended claims.

What is claimed is:

1. Disulfamylaniline having the structure:

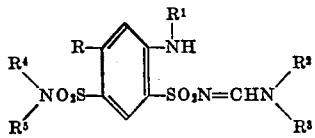

wherein R is selected from the group consisting of halogen, lower-alkyl, nitro and the amino group; $R^1$ is selected from the group consisting of hydrogen and lower alkyl;

is selected from the group consisting of mono-lower-alkylamino, di-lower-alkylamino, piperidyl, pyrrolidyl and morpholinyl; and

is selected from the group consisting of amino, mono-lower-alkyl-amino, di-lower-alkylamino, piperidyl, pyrrolidyl and morpholinyl.

2. 2-di-lower-alkylaminomethylenesulfamyl-4-sulfamyl-5-haloaniline.

3. 2-lower-alkylaminomethylenesulfamyl-4-sulfamyl-5-haloaniline.

4. 2-piperidinomethylenesulfamyl-4-sulfamyl-5-haloaniline.

5. 2-di-lower-alkylaminomethylenesulfamyl-4-sulfamyl-5-chloroaniline.

6. 2 - dimethylaminomethylenesulfamyl - 4-sulfamyl-5-5-chloroaniline.

7. 2-di-lower-alkylaminomethylenesulfamyl-4-sulfamyl-5-trifluoromethylaniline.

8. 2-dimethylaminomethylenesulfamyl-4-sulfamyl-5-trifluoromethylaniline.

9. 2-di-lower-alkylaminomethylenesulfamyl-4-sulfamyl-5-lower-alkylaniline.

10. 2-lower-alkylaminomethylenesulfamyl-4-sulfamyl-5-nitroaniline.

11. 2-lower-alkylaminomethylenesulfamyl-4-sulfamyl-5-aminoaniline.

12. Process wherein a benzothiadiazine compound having one of the structures

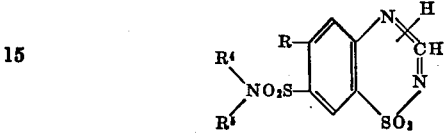

and

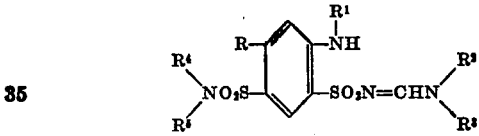

is reacted with a compound selected from the group consisting of mono-lower-alkylamine, di-lower-alkylamine, piperidine, pyrrolidine and morpholine to give a product having the structure

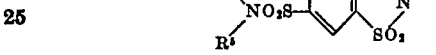

wherein R is selected from the group consisting of halogen, lower-alkyl, nitro and amino; $R^1$ is selected from the group consisting of hydrogen and lower alkyl;

is selected from the group consisting of mono-lower-alkylamino, di-lower-alkylamino, piperidyl, pyrrolidyl and morpholinyl; and

is selected from the group consisting of amino, mono-lower-alkylamino, di-lower-alkylamino piperidyl, pyrrolidyl and morpholinyl.

No references cited.